US006963825B1

(12) United States Patent
Morikawa et al.

(10) Patent No.: US 6,963,825 B1
(45) Date of Patent: Nov. 8, 2005

(54) OUTLINE EXTRACTING APPARATUS AND METHOD AND COMPUTER READABLE MEMORY MEDIUM

(75) Inventors: Shigeki Morikawa, Shizuoka-ken (JP); Taizou Nakamura, Shizuoka-ken (JP); Nobuaki Yoshida, Osaka-fu (JP); Kouichi Motoyama, Osaka-fu (JP); Toshihiro Kaneo, Osaka-fu (JP)

(73) Assignee: Kabushiki Kaisha Armonicos, (JP)

( * ) Notice: Subject to any disclaimer, the term of this patent is extended or adjusted under 35 U.S.C. 154(b) by 1000 days.

(21) Appl. No.: 09/688,766

(22) Filed: Oct. 16, 2000

(51) Int. Cl.[7] ............................................. G06F 17/10
(52) U.S. Cl. ........................................ 703/2; 345/420
(58) Field of Search ........................... 703/2; 700/120; 264/401; 345/420, 423, 473; 702/16

(56) References Cited

U.S. PATENT DOCUMENTS

| 5,059,359 | A | * | 10/1991 | Hull et al. | ................... | 264/401 |
| 5,137,662 | A | * | 8/1992 | Hull et al. | ................... | 267/401 |
| 5,850,229 | A | * | 12/1998 | Edelsbrunner et al. | ...... | 345/473 |
| 6,027,682 | A | * | 2/2000 | Almquist et al. | ........... | 264/401 |
| 6,046,745 | A | * | 4/2000 | Moriya et al. | ............... | 345/420 |
| 6,278,949 | B1 | * | 8/2001 | Alam | ........................... | 702/16 |
| 6,333,741 | B1 | * | 12/2001 | Snead et al. | ................. | 345/423 |
| 6,600,965 | B1 | * | 7/2003 | Hull et al. | ................... | 700/120 |
| 6,792,398 | B1 | * | 9/2004 | Handley et al. | ............... | 703/2 |

OTHER PUBLICATIONS

Certain et al., A. Automatic Body Measurement for Mass Customization of Garments, IEEE, Second International Conference on 3-D Digital Imaging and Modeling, Oct. 1999, pp. 405-412.*
Morikawa et al., H. 3-D Structure Extraction Coding of Image Sequences, IEEE, 1990 International Conference on Acoustics, Speech, and Signal Processing, ICASSP-90, Apr. 1990, pp. 1969-1972.*
Bottalico et al., M.A. EcoStudio: A Computer Tool to Support Carotid Ultrasound Images Analysis, Proceedings of the 22nd Annual EMBS International Conference of the IEEE, Engineering in Medicine and Biology Society, vol. 4, Jul. 2000, pp. 2428-2430.*
Roberts et al., D.G. A Prototype Skeleture Mapper for Automated Abattoir Application, IEEE, Fourth Annual Conference on Mechatronics and Machine Vision in Practice, Sep. 1997, pp. 45-50.*
Gueziec, A. Large Deformable Splines, Crest Lines and Matching, IEEE, Fourth International Confernce on Computer Vision, May 1993, pp. 650-657.*

* cited by examiner

*Primary Examiner*—Russell Frejd
(74) *Attorney, Agent, or Firm*—Harness, Dickey & Pierce, P.L.C.

(57) ABSTRACT

The present invention provide an outline extracting apparatus, a method for extracting an outline, a computer readable memory medium stored with an outline extracting program and a computer readable memory medium stored with an outline data which can exactly extract the outline less influenced by the dispersion of the non-contact point group data and also can exactly extract the outline of a corner having an acute angle.

The present invention is characterized in that it comprises an extracted origin data memory module for storing the CAD data and the non-contact measuring point data previously aligned with the CAD data; an analytic surface extracting module for extracting an analytic surface having a predetermined configuration from the CAD data; a surface generating module for carrying out the surface generation using the analytic surface and the non-contact measuring point data; and a crossing line extracting module for extracting a crossing line of surfaces generated by the surface generating module as the outline.

7 Claims, 7 Drawing Sheets

PRIOR ART

OUTLINE EXTRACTING APPARATUS AND METHOD AND COMPUTER READABLE MEMORY MEDIUM

BACKGROUND OF THE INVENTION

1. Field of the Invention

The present invention relates to an outline extracting apparatus using a CAD (Computer Aided Design) data and a non-contact measuring point data obtained by non-contact measuring an object, a method for extracting an outline, a computer readable memory medium stored with an outline extracting program and a computer readable memory medium stored with an outline data.

2. Description of Background Art

Figure 13:
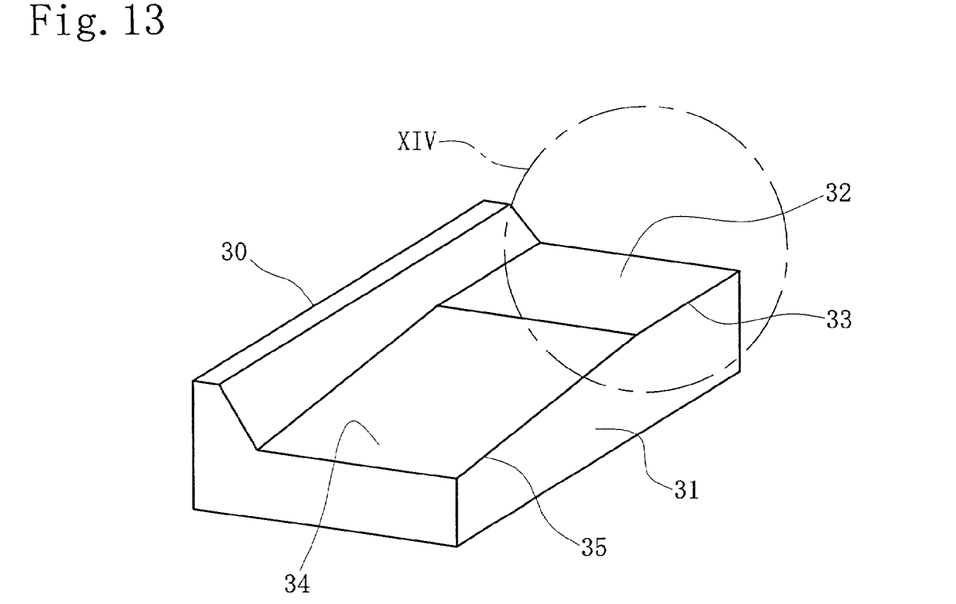
FIG. 13 illustrates an example of an object for which an outline is to be extracted.

Heretofore, there has been used a method for connecting two points in a point group forming a non-contact measuring point data using a straight line as a method for extracting an outline of an object (i.e. an article to be inspected) on a computer by using a non-contact measuring instrument such as a three dimensional scanner. The outline of the object is extracted by the conventional method by obtaining a data of the point group by non-contact measuring an article 30 to be inspected (FIG. 13) using the three dimensional scanner, and connecting two points in the obtained point group by a straight line to form a plurality of triangles.

Figure 14:
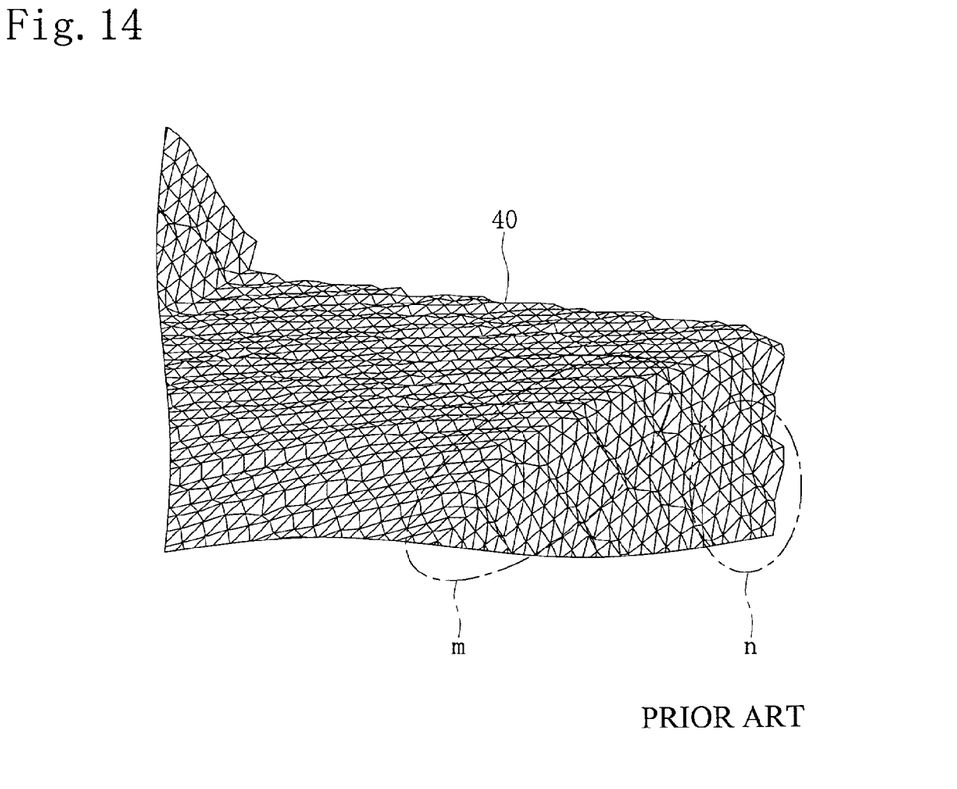
FIG. 14 illustrates the extraction results obtained according to a prior art method.

However, although the side 31 of the article 30 to be inspected is flat surface not having any irregularity, the extracted surface obtained according to the method of the prior art for extracting the outline of the object exhibits undulation as shown by a dashed line "n" in FIG. 14. This is because of the presence of dispersion in the data of the point group caused by the error of the non-contact measuring instrument. Thus it is very difficult to extract a flat surface by the conventional method.

In addition, an outline 33 formed by the upper surface 32 and the side surface 31 of the article 30 to be inspected as well as an outline 35 formed by the inclined surface 34 and the side surface 31 exhibit a rounded configuration as shown by a dashed line "m" in FIG. 14 which is different from the real outlines 33 and 35 each forming an acute edge. This is because that the data of the point group does not necessarily lie on the outlines 33 and 35. Thus it is very difficult to exactly extract the corner outline having an acute angle by the conventional method.

SUMMARY OF THE INVENTION

It is, therefore, an object of the present invention to provide an outline extracting apparatus, an outline extracting method, a computer readable memory medium stored with an outline extracting program, and a computer readable memory medium stored with an outline data which can minimize the influence due to the dispersion of the non-contact measuring point data and can also exactly extract the outlines of a flat surface as well as a corner having an acute angle.

According to the present invention of claim 1, there is provided an apparatus for extracting an outline of an object using a CAD data and a non-contact measuring point data comprising an extracted origin data memory means for storing the CAD data and the non-contact measuring point data previously aligned with the CAD data; an analytic surface extracting means for extracting an analytic surface having a predetermined configuration from the CAD data; a surface generating means for carrying out the surface generation using the analytic surface and the non-contact measuring point data; and a crossing line extracting means for extracting a crossing line of surfaces generated by the surface generating means as the outline.

According to the present invention of claim 2, there is provided an apparatus further comprising a nearby point extracting means for extracting the non-contact measuring point data within a predetermined distance from the analytic surface and for using the extracted non-contact measuring point data as the non-contact measuring point data used in the surface generating means.

According to the present invention of claim 3, there is provided a method for extracting an outline of an object using a CAD data and a non-contact measuring point data comprising steps of inputting the CAD data and the non-contact measuring point data previously aligned with the CAD data; extracting an analytic surface having a predetermined configuration from the CAD data; carrying out the surface generation using the analytic surface and the non-contact measuring point data; and extracting a crossing line of surfaces generated by the surface generating means as the outline.

According to the present invention of claim 4, there is provided a method further comprising steps of carrying out a nearby point process for extracting the non-contact measuring point data within a predetermined distance from the analytic surface and also carrying out the surface generation by using the nearby point processed non-contact measuring point data and the analytic surface.

According to the present invention of claim 5, there is provided a computer readable memory medium stored with a program for extracting an outline of an object using a CAD data and a non-contact measuring point data characterized in that said computer readable memory medium is further stored with a program for executing the computer an analytic surface extracting means for extracting an analytic surface having a predetermined configuration from the CAD data; a surface generating means for carrying out the surface generation using the analytic surface and the non-contact measuring point data; and a crossing line extracting means for extracting a crossing line of surfaces generated by the surface generating means as the outline.

According to the present invention of claim 6, there is provided a computer readable memory medium stored with a program for extracting an outline of an object using a CAD data and a non-contact measuring point data characterized in that said computer readable memory medium is further stored with a program for executing the computer an analytic surface extracting means for extracting an analytic surface having a predetermined configuration from the CAD data; a nearby point processing means for extracting the non-contact measuring point data within a predetermined distance from the analytic surface; a surface generating means for carrying out the surface generation using the analytic surface and the non-contact measuring point data extracted by the nearby point processing means; and a crossing line extracting means for extracting a crossing line of surfaces generated by the surface generating means as the outline.

Finally according to the present invention of claim 7, there is provided a computer readable memory medium stored with a data obtained by extracting an analytic surface having a predetermined configuration from the CAD data; carrying out the surface generation using the analytic surface and the non-contact measuring point data; and extracting a crossing line of surfaces generated by the surface generating means as the outline.

BRIEF DESCRIPTION OF THE DRAWINGS

Preferred embodiments of the present invention will be described with reference to the accompanied drawings in which.

DESCRIPTION OF THE PREFERRED EMBODIMENTS

As shown in FIGS. 1 through 12, an outline extracting apparatus 1 is an apparatus for extracting an outline 26 of an article 2 to be inspected (i.e. an object) using a CAD data 6 generated by a CAD input apparatus 3 and a point group data 7 which is a non-contact measuring point date of the article 2 measured by a point group data input apparatus 4. The outline extracting apparatus 1 is a computer and comprises for example a CPU (Central Processing Unit) 10 for controlling several devices, an input/output controller 11 for connecting a display 14 as well as an input apparatus 15 and the CPU 10, a memory 12 forming a memory medium of data, etc.

Figure 1:
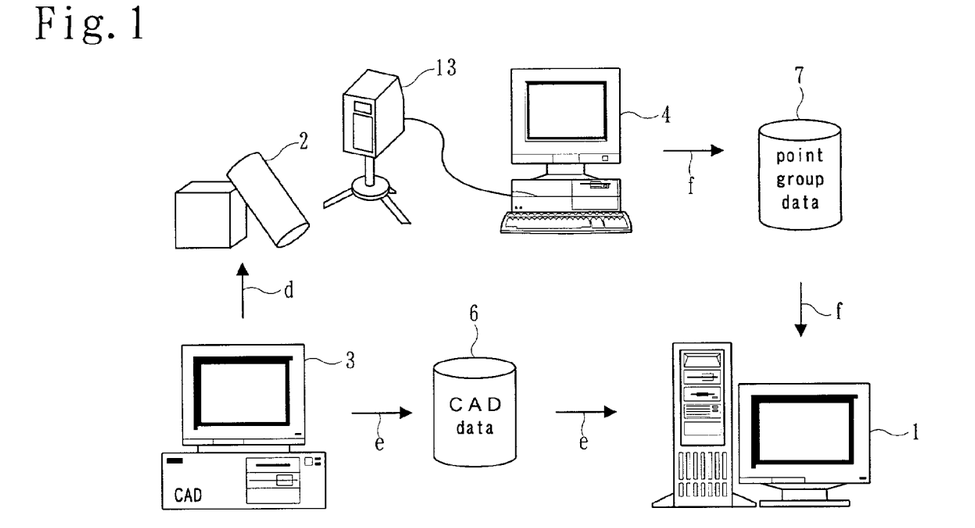
FIG. 1 is a schematic view showing an arrangement for carrying out the outline extraction of the present invention.

The CAD data 6 is a three dimensional graphic data inputted and generated by the CAD input apparatus 3 as well as a design data forming a base for manufacturing the article 2 to be inspected as shown by an arrow "d" in FIG. 1. That is, the article 2 to be inspected is that manufactured by the CAD data 6. Although the IGES (Initial Graphics Exchange Specification) can be mainly used as a format of the CAD data 6, the format is not limited thereto. The CAD data 6 is transmitted from the CAD input apparatus 3 to the outline extracting apparatus 1 as shown by an arrow "e" in FIG. 1. The transmission of the CAD data 6 along the arrow "e" may be carried out by using any memory medium such as a flexible disk or an MO (Magnet-Optical disk) or by using a communication of serial or parallel system with a cable connecting the CAD input apparatus 3 and the outline extracting apparatus 1. However the method of transmission is not limited to those mentioned.

The point group data 7 is obtained by scanning the outline of the article 2 to be inspected by a three dimensional scanner 13 using a laser beam connected to the point group data input apparatus 4 (i.e. a computer) and by datalizing the information as a group of points. Although the IGES can be mainly used as a format of the point group data 7, the format is not limited thereto. The point group data 7 is transmitted from the point group input apparatus 4 to the outline extracting apparatus 1 as shown by an arrow "f" in FIG. 1. The transmission of the point group data 7 along the arrow "f" may be carried out by using any memory medium such as a flexible disk or an MO or by using a communication of serial or parallel system with a cable connecting the point group input apparatus 4 and the outline extracting apparatus 1. Also the method of transmission is not limited to those mentioned.

Figure 3:
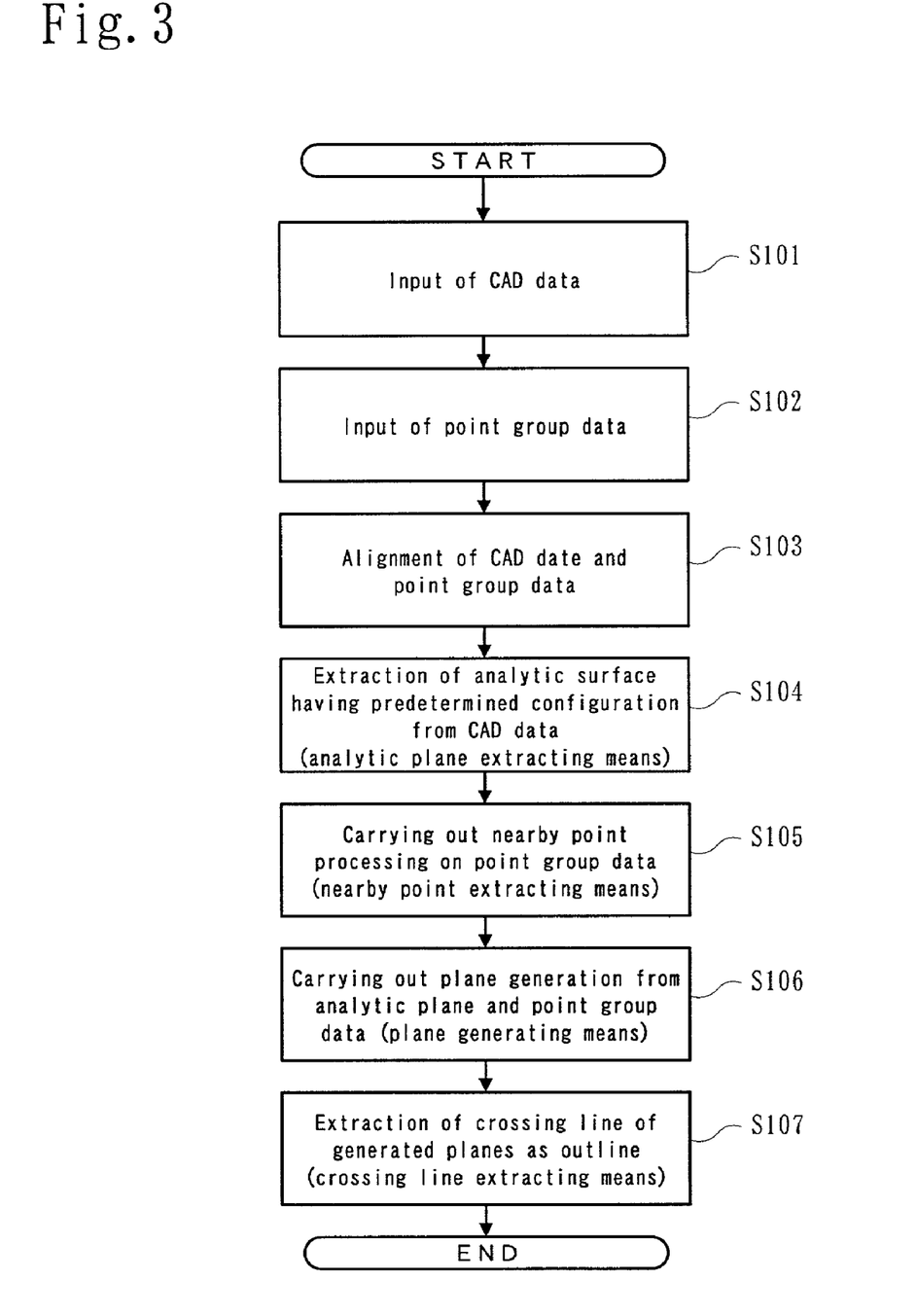
FIG. 3 is a flowchart showing the operation of the outline extracting apparatus of the present invention.
Figure 4:
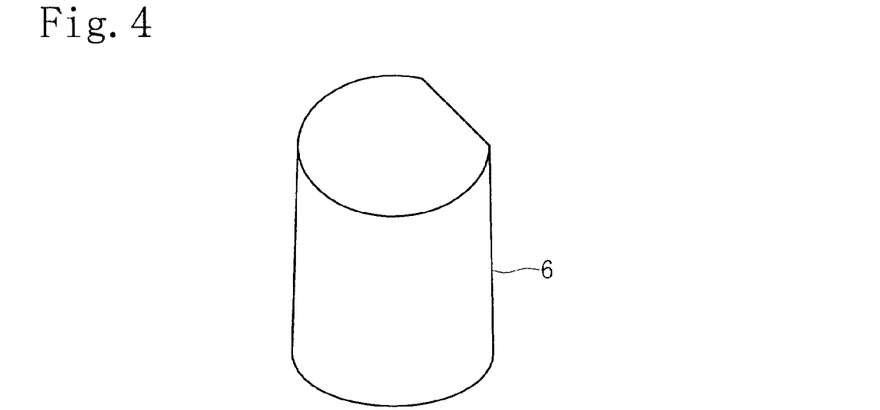
FIG. 4 is a perspective view showing an example of the CAD data.

The CPU 10 is programmed so that it performs operations shown in FIG. 3. Reference numerals in brackets in following descriptions correspond to those used in the flowchart in FIG. 3. As apparent from the flowchart in FIG. 3, the outline extracting apparatus 1 has functions of analytic surface extracting means (S104) for extracting an analytic surface having a predetermined configuration from the CAD data 6, a nearby point extracting means for carrying out a nearby point processing on the point group data 7 (S105), a surface generating means (S106) for carrying out the surface generation from the analytic surface and the point group data 7, and a crossing line extracting means (S107) for extracting a crossing line 25 of surfaces generated by the surface generating means as the outline 26.

The memory 12 forms not only an extracted origin data memory means for storing an extracted origin data 5 comprising the CAD data 6 and the point group data 7 but an outline data memory means for storing the extracted outline data 8.

Figure 5:
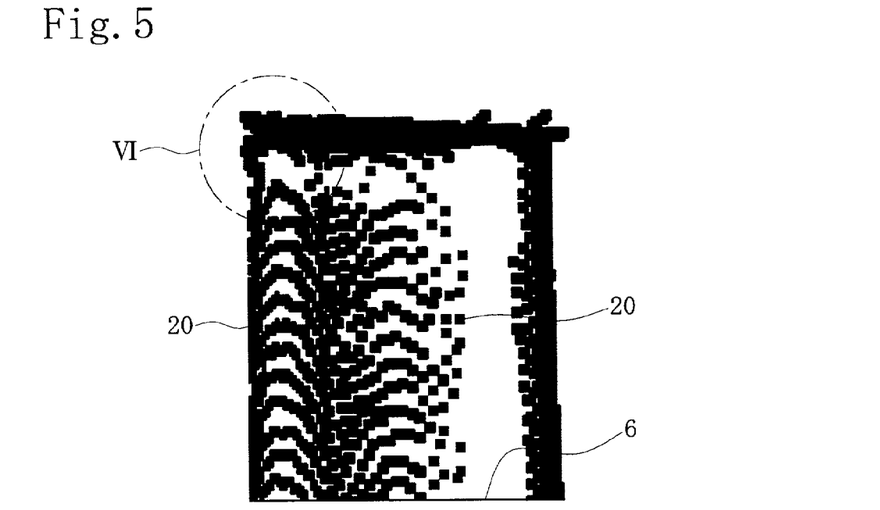
FIG. 5 is a side elevational view showing the data of the point group of the article to be inspected.
Figure 6:
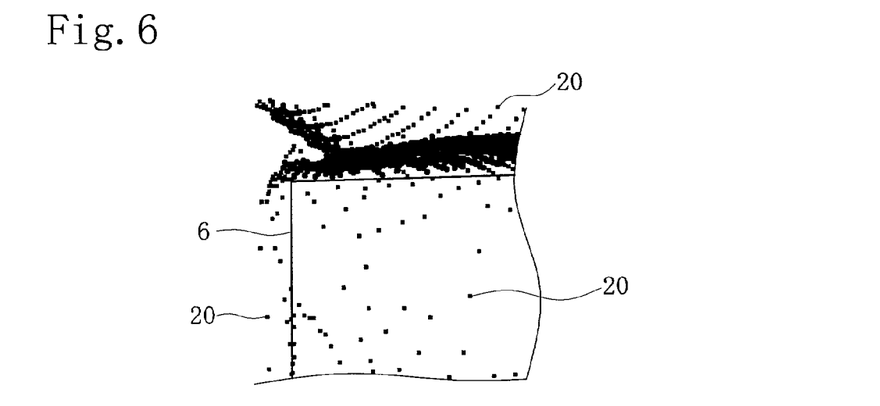
FIG. 6 is an enlarged view of a portion circled by a line VI in FIG. 5.

The operation of the outline extracting apparatus 1 of the preferred embodiment of the present invention will be hereinafter described. First of all, the outline extracting apparatus 1 inputs the CAD data 6 transmitted from the CAD input apparatus 3 to the memory 12 (S101). Then, the outline extracting apparatus 1 inputs the point group data 7 transmitted from the point group data input apparatus 4 to the memory 12 (S102) and aligns the CAD data 6 and the point group data 7 (S103). Owing to this alignment, the CAD data 6 and the point group data 7 are superimposed each other as shown in FIGS. 5 and 6. Although it is described that the alignment operation is carried out as one operation of the outline extracting apparatus 1, it may be possible to carry out the alignment operation by other apparatus than the outline extracting apparatus 1 and to input the CAD data 6 and the point group data 7 as a unit to the outline extracting apparatus 1.

Then the outline extracting apparatus 1 extracts from the CAD data 6 an analytic surface necessary for extracting the outline 26 (S104). The configuration of the analytical surface to be extracted is for example a plane, a cylindrical surface, a conical surface, a spherical surface etc. The extracting method of the analytical surface will be hereinafter described as to an example in a case that the analytical surface is an analytical plane 6a.

First of all, informations of lateral and vertical isoparametric curves are obtained from the NURBS (Non Uniform Rational B-Spline) curved surfaces which are a plurality of free-curved surfaces contained in the CAD data 6. A surface in which both the lateral isoparametric curve (hereinafter referred to "Cu") and the vertical isoparametric curve (hereinafter referred to "Cv") are parallel straight line group is recognized as the plane i.e. the analytic plane 6a. The informations as to the Cu and the Cv are substituted for a following plane formula ("Formula 1") to find a three dimensional vector $P_0$ representing the position of the analytic plane 6a, a three dimensional vector U representing the lateral direction of the analytical plane 6a, and a three dimensional vector V representing the vertical direction of the analytical plane 6a. In the formula 1, characters "u" and "v" are scalar values each representing a length. A plane in the extracted analytic planes having a micro width to which the point group data 7 is spanned is deleted and the remained planes are used for the outline extraction.

$$\overline{P}(u, v) = \overline{P}_0 + u \times \overline{U} + v \times \overline{V} \qquad \text{[Formula 1]}$$

When one of Cv and Cu is the parallel straight line group and the other is a circle group each circle having an equal radius and a coaxial center, it is regarded as the cylindrical surface and the informations as to Cu and Cv are substituted for a following Formula 2 of the cylindrical surface to find three dimensional vectors $P_0$, U and V, a three dimensional vector N representing the height direction of the analytical cylindrical surface 6b, and a radius "r" of the analytical cylindrical surface 6b. In Formula 2, characters "θ" and "h" are scalar values representing the depression angle and the height respectively.

$$\overline{P}(\theta, h) = \overline{P}_0 + h \times \overline{N} + r \times \overline{U} \times \cos\theta + r \times \overline{V} \times \sin\theta \qquad \text{[Formula 2]}$$

In addition, when one of Cv and Cu is the straight line group and the other is a circle group each circle having a gradually varied radius and a coaxial center, it is regarded as the conical surface and the informations as to Cu and Cv are substituted for a following Formula 3 of the conical surface to find three dimensional vectors $P_0$, U, V and N, and an elevation angle "φ" of the analytical conical surface.

$$\overline{P}(\theta, h) = \overline{P}_0 + h \times \overline{N} + h \times \overline{N} \times \tan\phi \times \overline{U} \times \cos\theta + h \times \overline{N} \times \tan\phi \times \overline{V} \times \sin\theta \qquad \text{[Formula 3]}$$

Furthermore, when one of Cv and Cu is the circle group each having an equal radius and the other is a circle group each circle having a gradually varied radius and a coaxial center, it is regarded as the spherical surface and the informations as to Cu and Cv are substituted for a following Formula 4 of the spherical surface to find three dimensional vectors $P_0$, U, V and N, and an radius "r".

$$\overline{P}(\theta, h) = \overline{P}_0 + r \times \cos\phi \times (\overline{U} \times \cos\theta + \overline{V} \times \sin\theta) + r \times \overline{N} \times \sin\phi \qquad \text{[Formula 4]}$$

Figure 7:
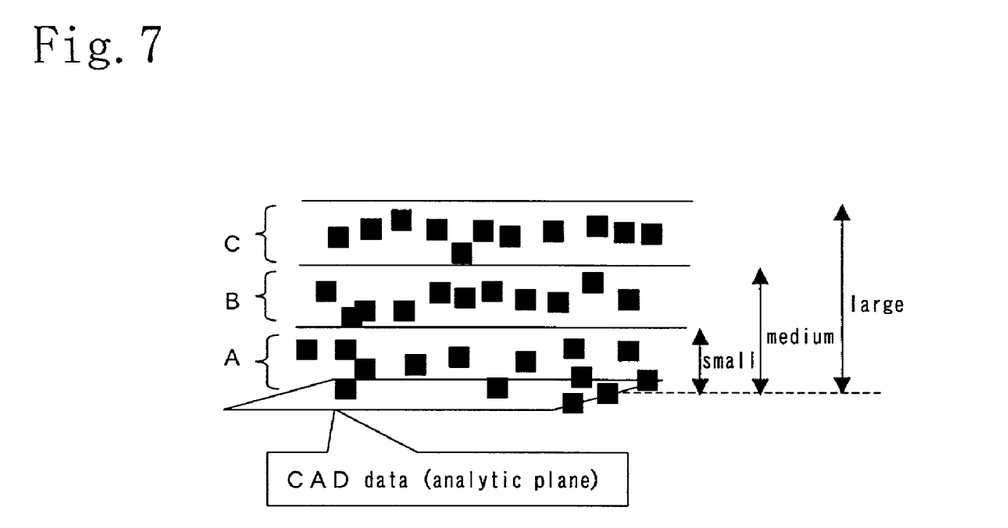
FIG. 7 is an explanatory view showing the state of the nearby points.
Figure 8:
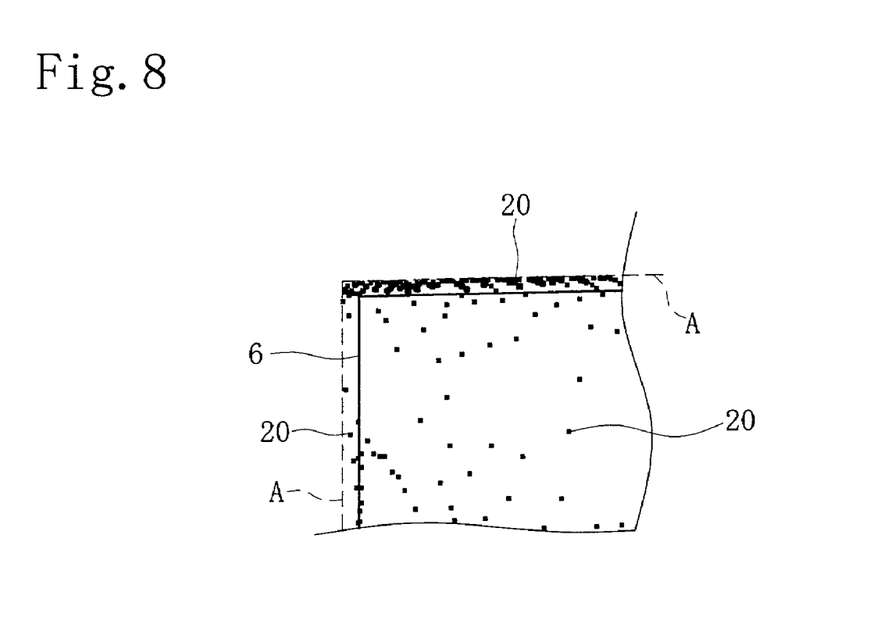
FIG. 8 is a side-elevational view showing an essential portion of FIG. 6 after having carried out the nearby point process thereof.
Figure 9:
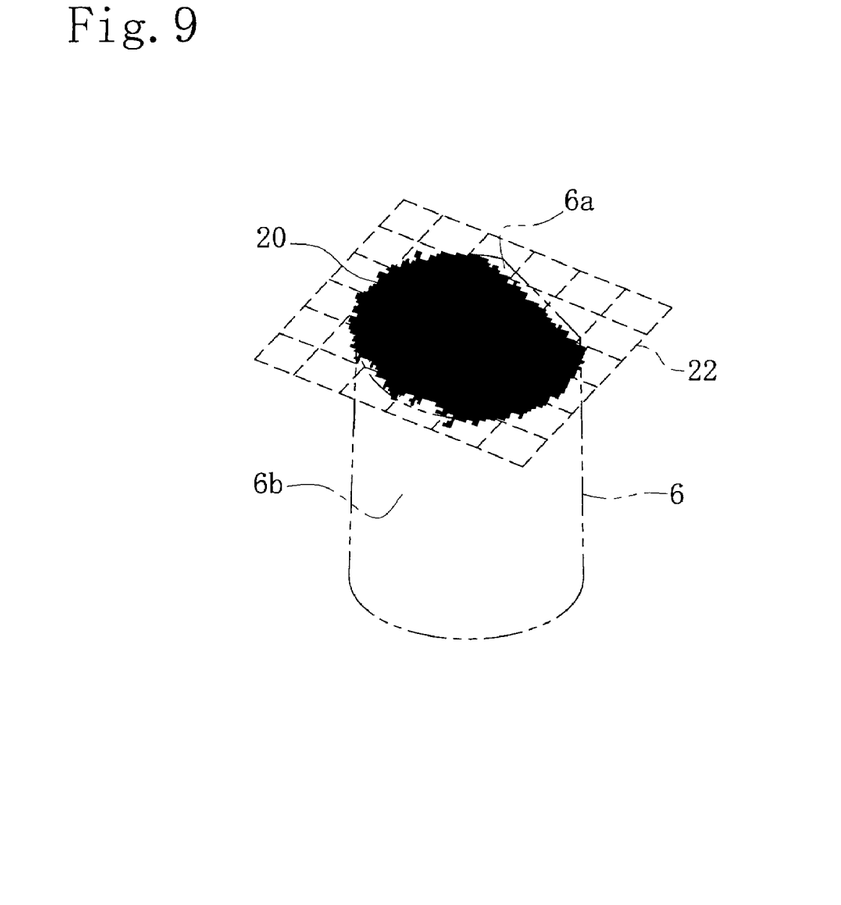
FIG. 9 is a perspective view showing the state of the surface generation.

Then the nearby point processing is carried out (S105). In the nearby point process, a point 20 nearest to a certain analytical plane is found by the shortest distance calculation and the extracted point 20 is positioned on the point group data 7 forming its analytical plane. Then the point group data 7 is divided to several small groups A, B, C . . . in accordance with the distances from the analytical plane and based upon a pre-inputted threshold as shown in FIG. 7. The groups away from the analytical plane are deleted from the point group data 7 at need. FIG. 8 shows a condition in which only the group A has been remained and the other group B and C have been deleted. From this work, it is possible to remove the dispersion due to the error of the three dimensional scanner 13 included in the point group data 7. If the nearby point process is not be carried out, it is carried out in the following mentioned surface generating means prior to the surface generation.

Then the surface generation is carried out in accordance with the information of the analytical surface and the point group data 7 positioned on the analytical surface (S106). Again, an analytical plane 6a in which the analytical surface is a flat surface will be hereinafter described. Since the point group data 7 positioned on the analytical plane 6a is strictly a point group forming the plane, it is possible to unconditionally find each value shown in a following Formula 5 of plane using this point group data 7.

$$\overline{P}(u, v) = \overline{P}_1 + u \times \overline{U} + v \times V \qquad \text{[Formula 5]}$$

Figure 10:
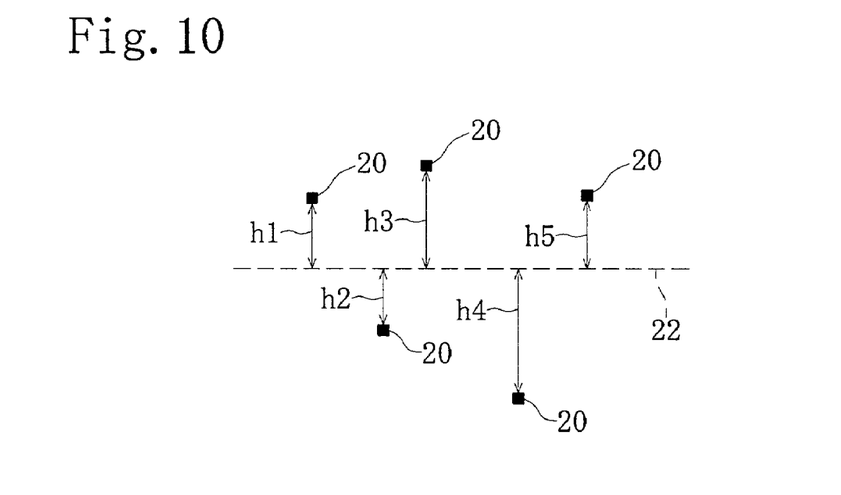
FIG. 10 is an explanatory view showing the state of the surface generation.

Concretely, the three dimensional vector $P_1$ representing the position of the plane which is an information of the asymptotic surface having a highest balance for example of (h1+h3+h5) and (h2+h4) and the three dimensional vector U-outer product-three dimensional vector V are found by adding a calculation of the least square method on the information of each point 20 as shown in FIG. 10. Then the three dimensional vector U and the three dimensional vector V are found by solving the three dimensional vector U-outer product-three dimensional vector V in accordance with that the condition of the three dimensional vector U and the three dimensional vector V being orthogonal is satisfied. With the result of which the plane formula of the generated plane 22 is completed and thus the plane 22 can be generated.

Since the point group data 7 positioned on the analytical cylinder 6b is strictly a point group forming the cylindrical surface when the analytical surface is the analytical cylindrical surface 6b, it is possible to unconditionally find each value shown in a following Formula 6 of cylindrical surface using this point group data 7.

$$\overline{P}(\theta, h) = \overline{P}_1 + h \times \overline{N} + r \times \overline{U} \times \cos\theta + r \times \overline{V} \times \sin\theta \qquad \text{[Formula 6]}$$

Concretely, the three dimensional vectors $P_1$ and N and the radius "r" are found by using the least square method similarly to the generated plane 22. The three dimensional vector U and the three dimensional vector V are found from the value of the three dimensional vector N by solving the formula 6 in accordance with that the condition of the three dimensional vector U and the three dimensional vector V being orthogonal is satisfied. With the result of which the formula of the generated cylindrical surface 23 is completed and thus the cylindrical surface 23 can be generated.

Since the point group data 7 positioned on the analytical conical surface is strictly a point group forming the conical surface when the analytical surface is the analytical conical surface, it is possible to unconditionally find each value shown in a following Formula 7 of conical surface using this point group data 7.

$$\overline{P}(\theta, h) = \overline{P}_1 + h \times \overline{N} + h \Delta \overline{N} \times \tan\phi \times \overline{U} \times \cos\theta + h \times \overline{N} \times \tan\phi \times \overline{V} \times \sin\theta \qquad \text{[Formula 7]}$$

Concretely, the three dimensional vectors $P_1$ and N and the elevation angle "φ" are found by using the least square method similarly to the generated plane 22. The three dimensional vector U and the three dimensional vector V are found from the value of the three dimensional vector N by solving the formula 7 in accordance with that the condition of the three dimensional vector U and the three dimensional vector V being orthogonal is satisfied.

Since the point group data 7 positioned on the analytical spherical surface is strictly a point group forming the spherical surface when the analytical surface is the analytical spherical surface, it is possible to unconditionally find each value shown in a following Formula 8 of spherical surface using this point group data 7.

$$\overline{P}(\theta, h) = \overline{P}_1 + r \times \cos\phi \times (\overline{U} \times \cos\theta + \overline{V} \times \sin\theta) + r \times \overline{N} \times \sin\phi \qquad \text{[Formula 8]}$$

Concretely, the three dimensional vectors $P_1$ and the radius "r" are found by using the least square method similarly to the generated plane 22.

Figure 11:
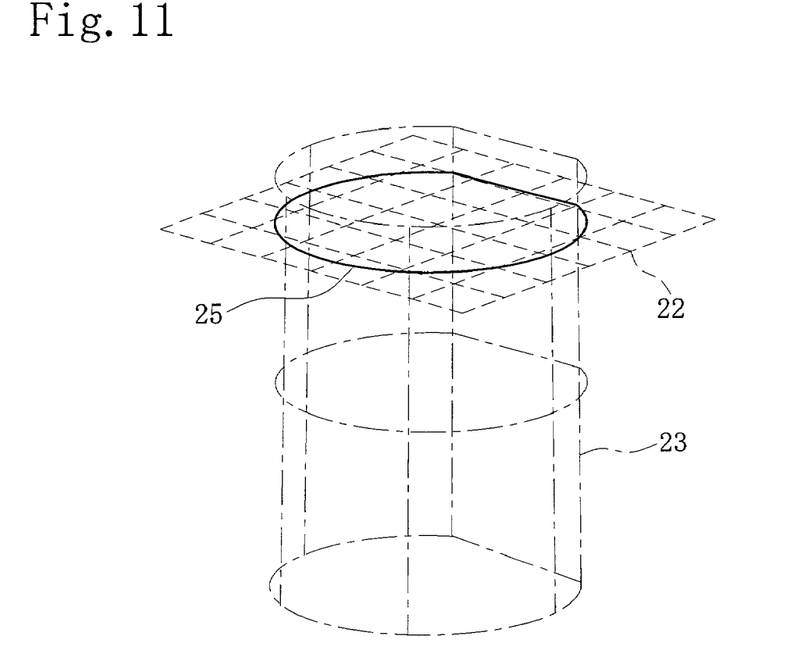
FIG. 11 is a perspective view showing the state of the crossing line.
Figure 12:
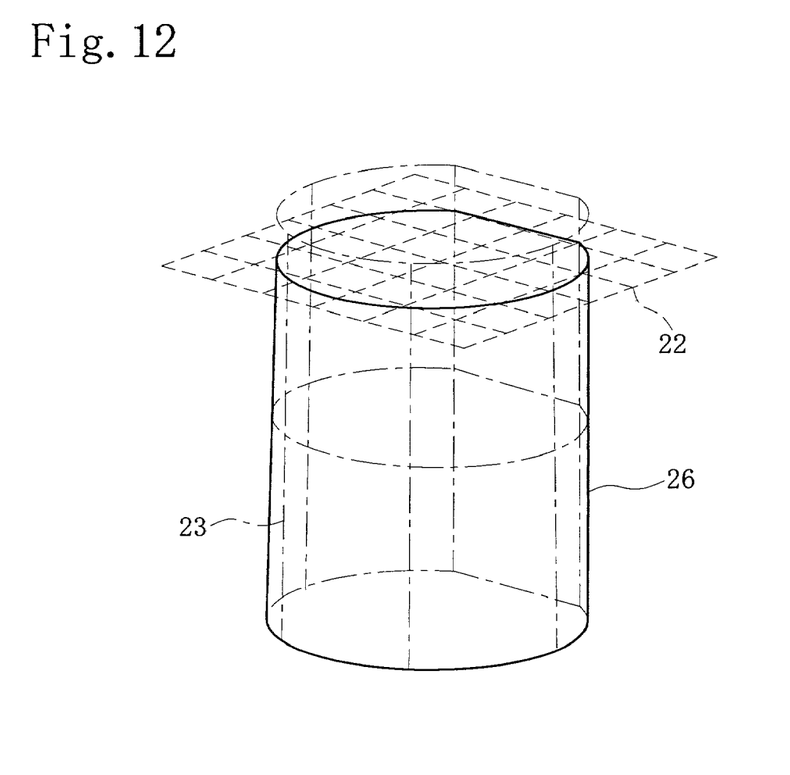
FIG. 12 is a perspective view showing the state of the outline.

Then the crossing line 25 formed by the generated surfaces is found and the crossing line 25 is extracted as an outline 26 (S107). Concretely, the crossing line 25 formed by the generated plane 22 and the generated cylindrical surface 23 can be extracted by performing the crossing line calculation as to these surfaces 22 and 23 for example as shown in FIG. 11. Then this outline defined by the generated plane 22, the generated cylindrical surface 23 and the crossing line 25 is fixed. Thus the outline 26 of the article 2 to be inspected can be extracted.

It is possible to carry out an inspection whether the article 2 to be inspected is finished in accordance with the CAD data 6 by comparing the outline data 8 being a data of the extracted outline 26 with the CAD data 6. It is also possible to transmit the outline data 8 to the other inspecting apparatus by storing the outline data 8 in the computer readable memory medium such as the flexible disk 16. The transmission can be carried out by using wiring or other communication means without using any memory medium.

According to the preferred embodiment of the present invention, the crossing line 25 of the generated surfaces is extracted as the outline 26 by extracting the analytical surface having a predetermined configuration for example such as a flat surface, a cylindrical surface, a conical surface etc. from the CAD data 6, and by carrying out the surface generation using the analytical surface and the point group data 7. Accordingly, it is possible to have the extracted external appearance of an object formed by smooth surfaces generated by the surface generating means, and also to exactly extract the outline less influenced by the dispersion of the point group data 7. In addition, it is possible to exactly extract the outline 26 of a corner having an acute angle because of using the crossing line 25 of surfaces as the outline 26.

Furthermore, it is possible to exclude the point group data 7 having a large error and to have a more exact surface generation since only the point group data 7 within a predetermined distance from the analytical surface is extracted.

According to the preferred embodiment of the present invention, the CAD data 6 is generated by a computed other than the outline extracting apparatus 1 and transmitted to the outline extracting apparatus 1. However, it is possible to carry out both the generation of the CAD data 6 and the extraction of the outline by a same computer.

Figure 2:
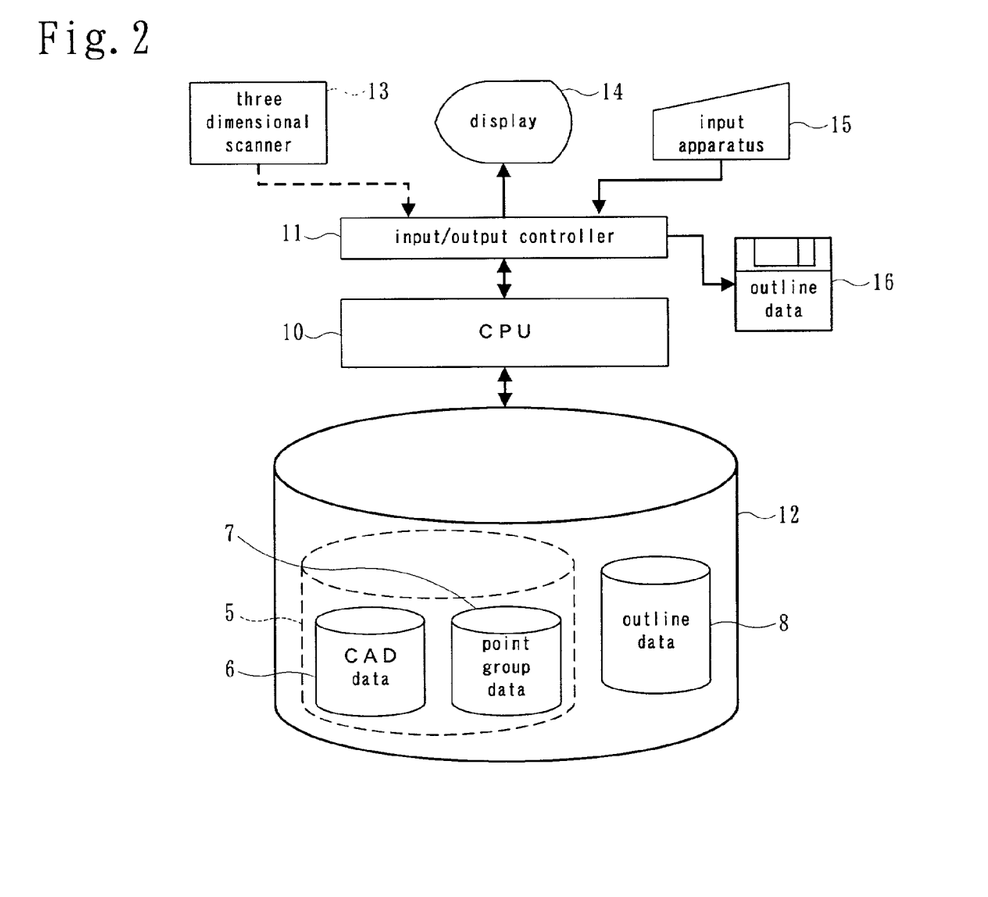
FIG. 2 is a schematic view showing an arrangement of the outline extracting apparatus of the present invention.

Also it is possible to obtain the point group data 7 by directly connecting the non-contact measuring instrument i.e. the three dimensional scanner 13 to the outline extracting apparatus 1 as shown by a dotted line in FIG. 2. In addition it is possible to generate the CAD data 6 by the outline extracting apparatus 1 to which the three dimensional scanner 13 is connected and thus to realize the outline extracting apparatus 1 having both functions of the CAD input apparatus 3 and the point group data input apparatus 4.

In the preferred embodiment of the present invention, it has been described that the outline extracting apparatus 1 is just as a dedicated apparatus for extracting an outline. However, it is possible to have a computer carry out a more exact outline extraction having less influence of the dispersion of the point group data 7 by storing in a computer readable memory medium a program for executing the computer the analytic surface extracting means for extracting an analytic surface having a predetermined configuration from the CAD data 6, the nearby point processing means for extracting the point group data 7 within a predetermined distance from the analytic surface, the surface generating means for carrying out the surface generation using the analytic surface and the point group data 7 extracted by the nearby point processing means, and the crossing line extracting means for extracting a crossing line 25 of surfaces generated by the surface generating means as the outline 26.

According to the present invention of claim 1, since the apparatus for extracting an outline of an object has the analytic surface extracting means for extracting an analytic surface having a predetermined configuration from the CAD data, and the crossing line extracting means for extracting a crossing line of generated surfaces as the outline, it is possible to have the extracted external appearance of an object formed by smooth surfaces generated by the surface generating means, and also to exactly extract the outline less influenced by the dispersion of the non-contact point group data. In addition, it is possible to exactly extract the outline of a corner having an acute angle because of using the crossing line of surfaces as the outline.

According to the present invention of claim 2, since it has the nearby point extracting means for extracting only the non-contact measuring point data within a predetermined distance from the analytic surface, it is possible to exclude the point group data having a large error and thus to have a more exact surface generation.

According to the present invention of claim 3, since it steps of extracting an analytic surface having a predetermined configuration from the CAD data, carrying out the surface generation using the analytic surface and the non-contact measuring point data, and extracting a crossing line of surfaces generated by the surface generating means as the outline, it is possible to have the extracted external appearance of an object formed by smooth surfaces generated by the surface generating means, and also to exactly extract the outline less influenced by the dispersion of the non-contact point group data. In addition, it is possible to exactly extract the outline of a corner having an acute angle because of using the crossing line of surfaces as the outline.

According to the present invention of claim 4, since it has the step of carrying out a nearby point process for extracting only the non-contact measuring point data within a predetermined distance from the analytic surface, it is possible to exclude the point group data having a large error and thus to have a more exact surface generation.

According to the memory medium of the present invention of claim 5, since it is stored with the program for executing a computer the analytic surface extracting means for extracting an analytic surface having a predetermined configuration from the CAD data, the surface generating means for carrying out the surface generation using the analytic surface and the non-contact measuring point data, and the crossing line extracting means for extracting a crossing line of surfaces generated by the surface generating means as the outline, it is possible to have the extracted external appearance of an object formed by smooth surfaces generated by the surface generating means, and also to exactly extract the outline less influenced by the dispersion of the non-contact point group data. In addition, it is possible to exactly extract the outline of a corner having an acute angle because of using the crossing line of surfaces as the outline.

According to the memory medium of the present invention of claim 6, since it is stored with the program for executing the computer an analytic surface extracting means for extracting an analytic surface having a predetermined configuration from the CAD data, the nearby point processing means for extracting the non-contact measuring point data within a predetermined distance from the analytic surface, the a surface generating means for carrying out the surface generation using the analytic surface and the non-contact measuring point data extracted by the nearby point processing means, and the crossing line extracting means for extracting a crossing line of surfaces generated by the surface generating means as the outline, it is possible in addition to the effects of the invention of claim 5 to exclude the point group data having a large error and thus to have a more exact surface generation.

According to the memory medium of the present invention of claim 7, it is stored with the data obtained by extracting an analytic surface having a predetermined configuration from the CAD data, carrying out the surface generation using the analytic surface and the non-contact measuring point data, and extracting a crossing line of surfaces generated by the surface generating means as the outline, it is possible to have the extracted external appearance of an object formed by smooth surfaces generated by the surface generating means, and also to exactly extract the outline less influenced by the dispersion of the non-contact point group data. In addition, it is possible to exactly extract the outline of a corner having an acute angle because of using the crossing line of surfaces as the outline.

What is claimed is:

1. A computer-implemented apparatus for extracting an outline of an object using a CAD data and a non-contact measuring point data comprising an extracted origin data memory module that stores the CAD data and the non-contact measuring point data previously aligned with the CAD data; an analytic surface extracting module that extracts an analytic surface having a predetermined configuration from the CAD data; a surface generating module that carries out surface generation using the analytic surface and the non-contact measuring point data; and a crossing line extracting module that extracts a crossing line of surfaces generated by the surface generating module as the outline.

2. An apparatus of claim 1 wherein further comprising a nearby point extracting module that extracts the non-contact measuring point data within a predetermined distance from the analytic surface and that uses the extracted non-contact measuring point data as the non-contact measuring point data used in the surface generating module.

3. A computer-implemented method for extracting an outline of an object using a CAD data and a non-contact measuring point data comprising steps of inputting the CAD data and the non-contact measuring point data previously aligned with the CAD data; extracting an analytic surface having a predetermined configuration from the CAD data; carrying out the surface generation using the analytic surface and the non-contact measuring point data; and extracting a crossing line of surfaces generated by the surface generating means as the outline.

4. A method of claim 3 wherein further comprising steps of carrying out a nearby point process for extracting the non-contact measuring point data within a predetermined distance from the analytic surface and also carrying out the surface generation by using the nearby point processed non-contact measuring point data and the analytic surface.

5. A computer readable memory medium stored with a program for extracting an outline of an object using a CAD data and a non-contact measuring point data characterized in that said computer readable memory medium is further stored with a program for executing in a computer an analytic surface extracting module that extracts an analytic surface having a predetermined configuration from the CAD data; a surface generating module that carries out surface generation using the analytic surface and the non-contact measuring point data; and a crossing line extracting module that extracts a crossing line of surfaces generated by the surface generating module as the outline.

6. A computer readable memory medium stored with a program for extracting an outline of an object using a CAD data and a non-contact measuring point data characterized in that said computer readable memory medium is further stored with a program for executing in a computer an analytic surface extracting module that extracts an analytic surface having a predetermined configuration from the CAD data; a nearby point processing module that extracts the non-contact measuring point data within a predetermined distance from the analytic surface; a surface generating module that carries out surface generation using the analytic surface and the non-contact measuring point data extracted by the nearby point processing module; and a crossing line extracting module that extracts a crossing line of surfaces generated by the surface generating module as the outline.

7. A computer readable memory medium with a computer-executable program which stores data obtained by extracting an analytic surface having a predetermined configuration from CAD data; carrying out the surface generation using the analytic surface and non-contact measuring point data; and extracting a crossing line of surfaces generated during the carrying step as the outline.

* * * * *

UNITED STATES PATENT AND TRADEMARK OFFICE
CERTIFICATE OF CORRECTION

PATENT NO. : 6,963,825 B1  
DATED : November 8, 2005  
INVENTOR(S) : Shigeki Morikawa et al.

Page 1 of 1

It is certified that error appears in the above-identified patent and that said Letters Patent is hereby corrected as shown below:

<u>Title page,</u>  
Item [56], References Cited, OTHER PUBLICATIONS,  
"Gueziec, A." reference, "Confernce" should be -- Conference --.

<u>Column 6,</u>

Line 48, " $\overline{P}(\theta,h) = \overline{P_1} + h \times \overline{N} + h\Delta\overline{N} \times \tan\phi \times \overline{U} \times \cos\theta + h \times \overline{N} \times \tan\varphi \times \overline{V} \times \sin\theta$ "

should be -- $\overline{P}(\theta,h) = \overline{P_1} + h \times \overline{N} + h \times \overline{N} \times \tan\phi \times \overline{U} \times \cos\theta + h \times \overline{N} \times \tan\phi \times \overline{V} \times \sin\theta$ --.

Signed and Sealed this

Twenty-third Day of May, 2006

JON W. DUDAS  
*Director of the United States Patent and Trademark Office*